W. A. TOMPKINS.
ICE CREAM CONE BAKING MACHINE.
APPLICATION FILED JULY 15, 1915.
1,191,485.
Patented July 18, 1916.
2 SHEETS—SHEET 1.
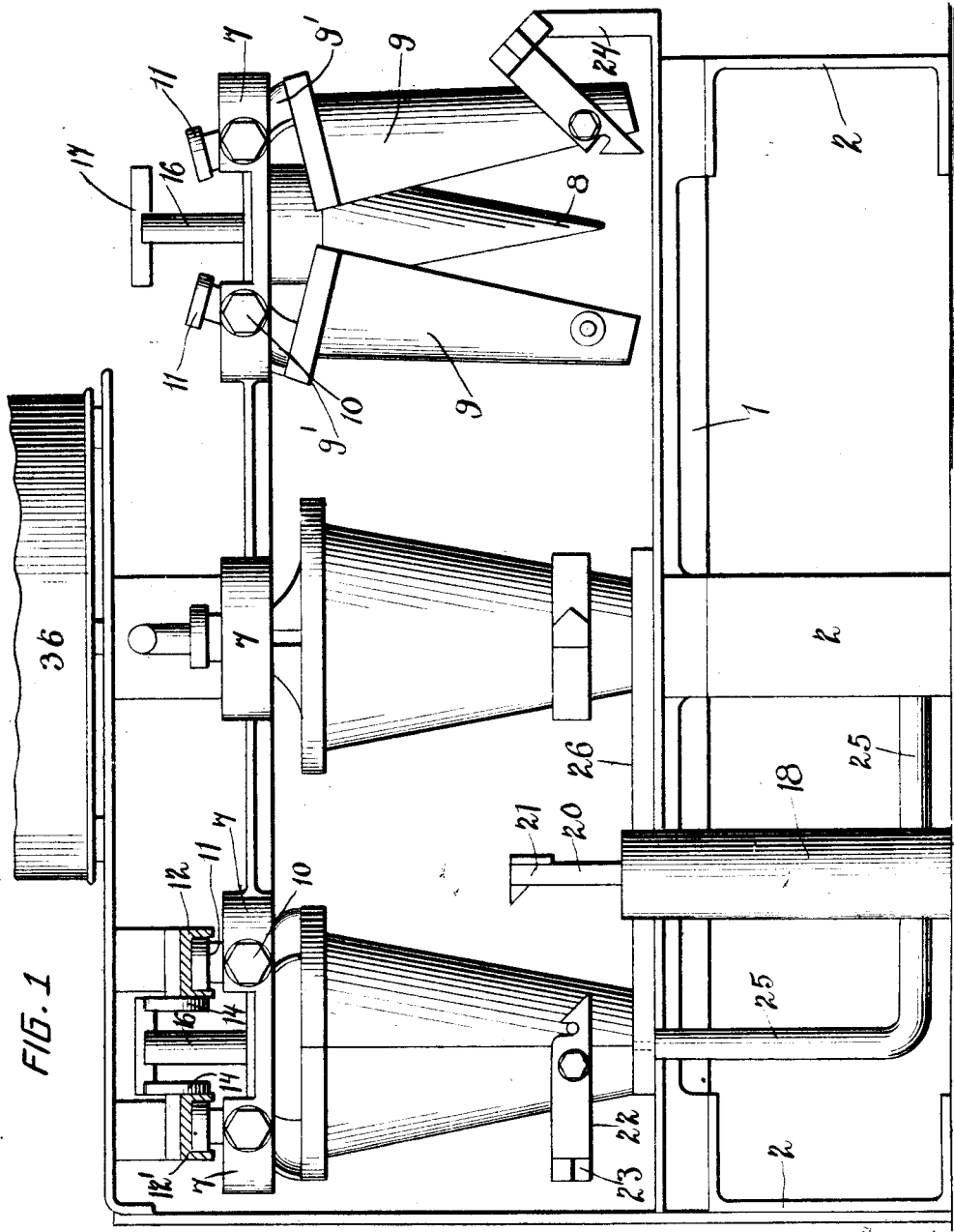
Witnesses
Inventor
W. A. Tompkins
Attorney W. A. TOMPKINS.
ICE CREAM CONE BAKING MACHINE.
APPLICATION FILED JULY 15, 1915.
1,191,485.
Patented July 18, 1916.
2 SHEETS—SHEET 2.
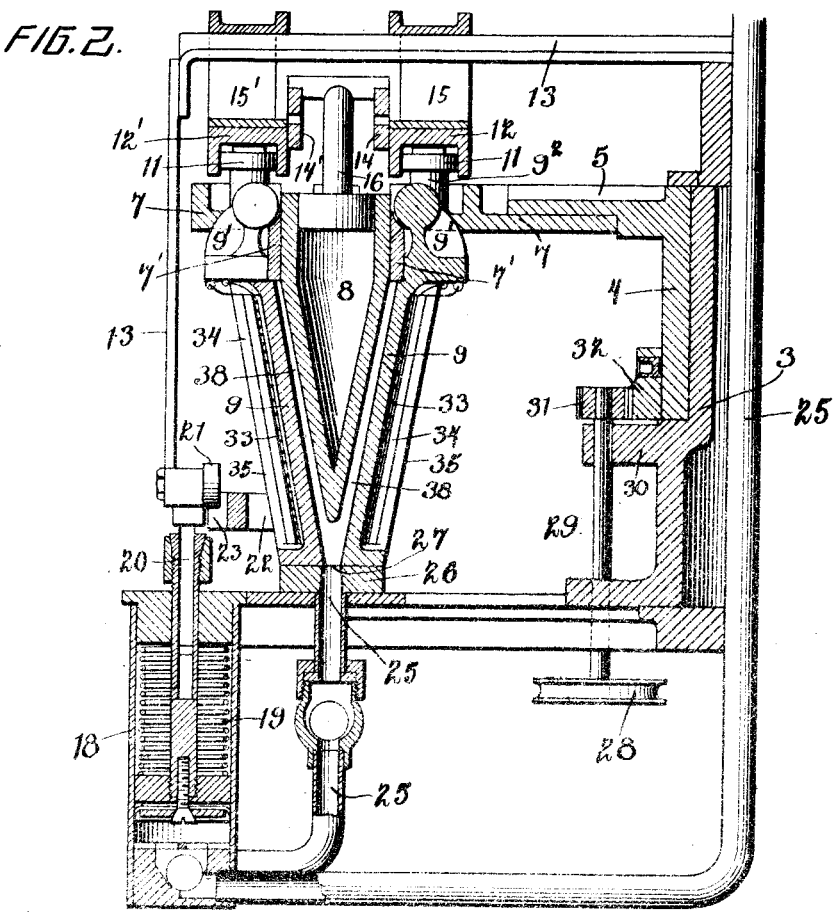
Inventor
W. A. Tompkins

UNITED STATES PATENT OFFICE.

WEBSTER A. TOMPKINS, OF PORTLAND, OREGON, ASSIGNOR TO C. A. CLARK, OF VANCOUVER, WASHINGTON.

ICE-CREAM-CONE-BAKING MACHINE.

1,191,485.  Specification of Letters Patent.  Patented July 18, 1916.

Application filed July 15, 1915. Serial No. 40,139.

*To all whom it may concern:*

Be it known that I, WEBSTER A. TOMPKINS, a citizen of the United States, residing at Portland, in the county of Multnomah and State of Oregon, have invented certain new and useful Improvements in Ice-Cream-Cone-Baking Machines; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to that class of "automatic baking machines" in which confection cones are baked from viscous batter in the annular space formed between the central cone shape core, or male member, of a mold, hereafter called the "core", and the convex conical two part female member of the mold hereafter called the "husk", which together with the core and their accessory parts forms an oven unit, which may be heated by gas burners or electrical resistance coils of a well known and widely used construction. The drawings forming a part of the application illustrates an electrically heated oven but no preference is expressed or claim made on its use.

The object of my invention is to provide a cheap and efficient method of baking confection cones, whereby the waste in baking may be materially reduced, and by eliminating hand labor the sanitary condition is greatly improved.

It is further my object to increase the capacity of machines of this class by providing a plurality of charging and discharging points so that the period of baking may be reduced without increasing the velocity of rotation or reducing the time necessary to charge or discharge the oven.

My invention resides principally in the combination of baking ovens suspended from the outer ends of spokes, or arms, of a wheel rotating in a horizontal plane, the ends of said arms being adapted to hinge the two part husk of the oven in such manner that it can be opened and closed at pre-determined points to discharge the baked cone and receive a fresh charge of batter supplied through an opening in the bottom of the husk by a force pump operated by the latch member of the rotating ovens.

In order that the invention may be better understood, attention is now called to the accompanying drawings, forming a part of this specification and in which:

Figure 1 is a side elevation. Fig. 2 is a transverse section of one of the ovens and half section of its support and means of actuation, and Fig. 3 is a detail plan view of the controlling cams.

In all the drawings, corresponding parts are represented by the same numerals of reference.

1 is a four spoked base spreader to which is attached the supporting legs 2. Upon the center of 1 is erected the supporting column 3 upon which is journaled the wheel hub 4, with its plurality of radiating arms 5, to which is affixed the oven support 7. The depending ring 7', which is cast integral with the other members 7, forms a guide for the vertically moving core 8. This core 8 is adapted to be raised, freeing itself from the baked cone and may also be depressed to compensate for shrinkage of the cone in baking.

The two part husk of the oven 9 is cast integral with the supporting hinge members 9' which are hinged upon centers 10, carried by the lugs cast integral with and forming a part of 7.

9² is a boss cast integral with the elements 9 and 9', upon which is journaled the wheels 11.

12 and 12' are converging and diverging cams supported from the frame-work 13.

14—14' are wheels, the bearing shafts of which are journaled in the bearing boxes 15 and 15', mounted upon the front end of the cams 12 and 12'.

16 is an upright staff affixed to 8, and carrying upon its upper end a cross bar 17.

18 is a single acting force pump, the downward stroke of which is produced by the spring 19; 20 is the piston rod, the upper end of which carries an engagement wheel 21.

22 is a latch by means of which the lower portions of the husk 9 are locked together.

23 is a boss upon the latch 22 which by coming in contact with the stationary pawl 24 unlocks the husk 9. The boss 23 is also adapted to engage 21.

36 is a container for the viscous batter from which the cones are baked. This is supplied to the ovens by means of the pipe 25 and the pump 18.

26 is a curved bearing plate adapted to close the opening 27 in the bottom of the husk 9.

28 is a grooved pulley mounted upon the lower end of the shaft 29, said shaft 29 being journaled in the bed plate 7 and bracket 30. The shaft 29 carries upon its upper end a pinion 31 which engages the gear 32, said gear 32 being mounted upon the lower end of the wheel hub 4. The source of power to the pulley 28 is not shown but may be derived from any suitable source.

33 is a resistance coil of suitable construction supplied with current from any suitable source, clamped against the baking members 9 by the plate 34, the whole coil being packed with asbestos to prevent radiation of heat, and is finished by an outer casing 35.

The operation will be as follows:—Having brought the ovens to a suitable heat and filling the container 36 with batter of proper consistency, the flow of batter to the ovens may be started by operating the pump 18 by hand. Then, as the actuating mechanism is started, the top face of the boss 23 engages the wheel 21 on top of the pump plunger 20, raising the plunger and compressing the spring 19. The oven is brought to the position 37, Fig. 3, at which point the plunger of the pump 20—21 drops from the boss 23 forcing a charge of batter into the annular space 38, between the core 8 and the husk 9 filling the same up to the ring 7'. As the ovens are in constant rotation, they pass from the opening of the paste tube 25 over the smooth surface of bearing plate 26, by means of which the opening 27 in the husk of the oven is closed until the batter is sufficiently baked not to be fluid, after which the baking is continued until completed at the point 39, Fig. 3, at which point the cross-piece 17 on the top of the core staff 16 engages 14 and 14' by which means the core 8 is raised vertically sufficient to free the core from the baked cone, coincident with the raising of the core, the boss 23 of the latch member 22 engaged the stationary pawl 24, raising 22 up and unlocking the oven; at this time, the wheels 11 and 11' mounted in the bosses of the hinged members 9² entered the converging cams 12 and 12' by which the husk of the oven is opened at 40, liberating the baked cone which drops into a suitable receptacle, after the cone has dropped, the angle of the cams 12 and 12' change to divergence and the ovens close and lock, completing the cycle.

It will readily be seen that, although I have described a machine with a plurality of single baking ovens upon the arms of the rotating wheel, that for a machine of increased capacity the number of arms may be increased and a plurality of ovens placed upon each arm. It is also my design to increase the number of charging and discharging points, as for example, upon opposite sides of the machine or upon the quadrants as may be desired. This is a very essential arrangement in obtaining a mechanical efficiency and will be fully set forth in the claims.

Having now described my invention, what I claim and desire to secure by Letters Patent, is as follows:

1. A baking machine comprising, in combination with a frame having a central supporting column forming a bearing, a wheel having radiating arms and a rotatably mounted hub portion supported and journaled upon said column, oppositely disposed oven supports secured to said arms, depending rings secured to the supports, vertical cores movable within and guided by said rings, oven sections with integral supporting hinge portions pivotally mounted upon said oven supports, wheels journaled upon projections of said hinged portions, stationary grooved cam members against the walls of which grooves said wheels are adapted to contact to cause the opening and closing of the oven members, and means for raising and lowering the cores.

2. A baking machine comprising, in combination with a frame having a central supporting column forming a bearing, a wheel having radiating arms and a rotatably mounted hub portion supported and journaled upon said column, oppositely disposed oven supports secured to said arms, depending rings secured to the supports, vertical cores movable within and guided by said rings, oven sections with integral supporting hinge portions pivotally mounted upon said oven supports, wheels journaled upon projections of said hinged portions, stationary grooved cam members against the walls of which grooves said wheels are adapted to contact to cause the opening and closing of the oven members, bearing boxes upon the cam members, a shaft journaled in said boxes, wheels upon the shafts, upright staffs fixed to said cores and having cross bars at their upper ends positioned in the paths of said wheels which are journaled upon the cams.

In testimony whereof I hereunto affix my signature in presence of two witnesses.

WEBSTER A. TOMPKINS.

Witnesses:
J. A. McKinnon,
E. D. Allen.